United States Patent [19]
Tsumura

[11] Patent Number: 5,842,023
[45] Date of Patent: Nov. 24, 1998

[54] INFORMATION SERVICE PROCESSOR

[75] Inventor: Tomoki Tsumura, Yokohama, Japan

[73] Assignee: Matsushita Electric Industrial Co., Ltd., Osaka, Japan

[21] Appl. No.: 754,062

[22] Filed: Dec. 3, 1996

[30] Foreign Application Priority Data

Dec. 6, 1995 [JP] Japan ................................ 7-318325

[51] Int. Cl.⁶ .................................................. G06F 9/00
[52] U.S. Cl. ........................................ 395/712; 295/200.76
[58] Field of Search ................................ 395/712, 200.76

[56] References Cited

FOREIGN PATENT DOCUMENTS

| | | |
|---|---|---|
| 0632397 | 1/1995 | European Pat. Off. . |
| 90/023382 | 3/1990 | WIPO . |
| 93/01550 | 1/1993 | WIPO . |

Primary Examiner—Robert B. Harrell
Assistant Examiner—David M. Ovedovitz
Attorney, Agent, or Firm—Lowe Hauptman Gopstein Gilman & Berner

[57] ABSTRACT

Provided is an information service processor that by adding control information to the provided information can expedite the use of the information that is furnished, or can prevent the illegal use of such information. For an information service whereby multimedia digital information, such as video, graphics and sound, is provided a user via broadcast communication means, an information service processor is connected to a network to receive an information service unit that consists of a main body of information and accompanying data from the broadcast communication means. A copyright information manager for processing information concerning copyrights is included in the information service unit, so that it manages copyright information precisely.

36 Claims, 5 Drawing Sheets

INFORMATION SERVICE PROCESSOR

BACKGROUND OF THE INVENTION

1. [Field of the Invention]

The present invention relates to an information service processor that supplies copyrighted multimedia digital information to a user via a broadcast communication network, and provides protection for such copyrighted information that is supplied; and that has an information format and a control system that facilitate the supply of various types of information to a user.

2. [Description of the Prior Art]

Recently, various information services, which are accessible via broadcast communication networks, have been made available and are being utilized. Such information services are, for example, facsimile information services using phone line networks, video services using CATV networks, and Internet services using computer networks. In the utilization of these information services, once a user has executed a contract with an information provider for a specific service or services, information provided to the user consists of almost raw data, so that copyright protection and information security are generally dependent on the good sense of the user. Since the execution of an information service contract covering the supply and use of information, the protection of copyrights and the security of information, and the use of the information that is supplied are independent matters, various problems have arisen concerning the provision of improved information services.

As was previously recited, for a conventional information service, the process that begins with the execution of a contract for the provision of information and culminates with the provision and use of information is not one that is performed integrally and systematically, and there have arisen such problems as a user not being able to rigorously manage information; not appropriately controlling the use of information furnished by a provider, so as to prevent illegal use and illegal copying; and not instituting adequate monitoring and management procedures, including those for security, for information received from a provider.

SUMMARY OF THE INVENTION

To resolve the above problems, it is a first object of the present invention to provide an information service processor that by adding control information to the provided information can expedite the use of the information that is furnished, or can prevent the illegal use and copying of such information.

It is a second object of the present invention to provide an information service processor that enables a user to rigorously manage supplied information so that such information can be used correctly.

It is a third object of the present invention to provide an information service processor with which an information provider can so manage information furnished a user that detailed charges can be included in the user's fee.

It is a fourth object of the present invention to provide an information service processor that can so perform a variety of information presentations that a person who is an information user can also be an information provider.

[Means to solve the Problem]

To achieve the above objects of the present invention, for an information service whereby multimedia digital information, such as video, graphics and sound, is provided a user via broadcast communication means, an information service processor comprises:

a communication connector, connected to a network, for receiving an information service unit consisting of a main body of information and attached data that are provided by the broadcast communication means;

a copyright information manager for handling information from the information service unit concerning a copyright;

a utilization manager for managing utilization of the information service unit by the user;

a region manager for managing the main body of information;

a storage device for accumulating control data employed to control the main body of information;

a file device for at least storing the main body of information in the information service unit;

an information utilizer for making available to the user, and controlling, the main body of information;

a terminal peripheral section serving as a specific medium that uses the main body of information;

a controller for controlling all operations of all of the above described components.

According to the present invention, information to be furnished is divided into a plurality of information regions. A plurality of additional data sets, which define individual information regions and are used to provide various types of controls, and region data, which can be the index for these accompanying data, accompany the main body of information. The combined information groupings form an information service unit, which is handled by the information service processor. In consonance with the divisions of the main body of information, a region manager is included in the information service processor.

With the above described arrangement, the controller determines whether the information that has been provided by the information provider, via the communication connector, may be stored in a user's storage device or file device. When storing of the information is not permitted, in the storage device are stored only region information data, which are used to control a divided information body, and data that are added to the information regions. The information body that is transferred following the information region data, and the accompanying data, is not stored in the storage device or the file device, but is transmitted to the terminal peripheral device via the information utilizer. The information is supplied to a user for on-line real time use, for interactive use, or for the playback of information. In this case, the form of the information is regulated by region data, and the accompanying data that are stored in the storage section, and in consonance with this regulation, the copyright information manager, the utilization manager, the information utilizer, and the terminal peripheral unit correctly control the supply of information.

Further, the information body is divided into a plurality of information regions. A plurality of accompanying data, which define the individual information regions and are used to perform various types of controls, and region data, which constitute the index for these accompanying data, are attached to the main body of information to construct an information service unit. In this case, the region manager designates one of the information regions of the divided information body to which the currently employed information belongs, and manages the information region.

Therefore, according to the present invention, the controller examines information that is supplied by the information provider, via the communication connector, to determine whether storing the information in the user's storage device or file device is permitted. When the storing is not permitted, only region data for the main body of information, and the accompanying region data, which are used to control the information body, are stored in the storage device. The main body of the information that is transferred following the region data and the accompanying data is stored neither in the storage device nor in the file device, but is transmitted to the terminal peripheral unit via the information utilizer. The information is then provided for a user for on-line real time use, for interactive use, or for information playback use. In this case, the form of the information is regulated by the region data and the accompanying data that are stored in the storage device, and in accordance with the regulation process, the supply of information is appropriately controlled by the region controller, the copyright information manager, the utilization manger, the information utilizer, and the terminal peripheral unit control. When the storing of the provided information is permitted, the information is temporarily stored in the file device. When the user employs the information, the controller reads the information attribute data and region data, and the accompanying region data from the storage device. The controller employs the entire processor to determine whether or not the purpose of a user and the format in use match the conditions specified by the information provider and that are included in the attribute data, the region data and the accompanying data. When the purpose and the use match the conditions, the main body of the information stored in the file device is sequentially read under the control of the region manager, and is supplied via the information utilizer to the user by the terminal peripheral unit.

According to the present invention, the use, the conditions, and the charging method for the information that is provided differ, depending on the regional divisions of the information body. Further, the order in which the regions to be used are connected differs, depending on the intent of the user. Therefore, the region manager manages the currently employed region in real time in order to monitor the use of information that is being changed and to ensure that it is being used correctly. The region manager maintains and controls the region connection for sequence control when information is employed. The region manager uses the region data to manage the currently employed accompanying data, and also supplies the information that is required for the correct employment of the controller, the copyright information manager, the utilization manager, the information utilizer, and the terminal peripheral unit. The substantial information that is to be used is transmitted from the file device or the storage device via the information utilizer to the terminal peripheral unit.

The copyright information manager examines the data concerning a copyright and portrait and ownership rights to determine, in accordance with the conditions governed by the accompanying data, whether or not a user has infringed or shall infringe by his or her act or intent, the copyright, the portrait right, or the ownership right. The copyright information manager then calculates a charge. The copyright information manager abandons any information that is no longer required. The utilization manager examines the information form and determines whether encryption is required, determines whether or not a log is required, authenticates a user, checks an intent for use, examines the presence of information and information abandonment conditions, manages a log, and detects alteration of information. When the intent of use does not match the conditions, the utilization manager instructs the information utilizer to inhibit the supply of information. Under the control of the utilization manager, the information utilizer decrypts the encrypted information, reprocesses video information, speech information or other types of information, converts information in consonance with the information use level, such as an image quality, and superimposes information for a plurality of regions. The information utilizer controls terminals, and also controls devices and converts information during printing and copying.

The information service processor can further comprise an information generator that is connected between the terminal peripheral unit and the file device. The information generator automatically generates a frame of accompanying data rows relative to original information that does not have accompanying data, so that an information frame can be prepared in the storage device to provide information, including accompanying data, for a new information service unit. The information generator generates information in the same form as that handled by the present system. A user of the present processor can act as an information provider, and can transmit the information that is generated by the information generator to another user via a network. In this case, it is possible to inhibit the copying and alteration of the information, to limit the number of users, to maintain the security of information by encrypting it, or to provide information for imposing charges for use.

According to claim 1 of the present application, an information service processor comprises:

a communication connector, connected to a network, for receiving an information service unit consisting of a main body of information and attached data that are provided by the broadcast communication means;

a copyright information manager for handling copyright information from the information service unit;

a utilization manager for managing utilization of the information service unit by the user;

a region manager for managing the main body of information;

a storage device for storing control data employed to control the main body of information;

a file device for storing at least the main body of information of the information service unit;

an information utilizer for exercising control while providing the main body of information to the user;

a terminal peripheral section as a specific medium for using the main body of information; and a controller for controlling all operations of all components. Under a precise control, the information that is supplied by the information provider via the communication connector is stored in a storage device or file device belonging to a user, or permission for its employment is provided.

According to claim 2 of the present application, in the information service processor cited in claim 1, the main body of information that forms the information service unit consists of a multimedia digital information set, and the main body of information is divided into a plurality of information regions. The attached data consists of attribute data, which is attached to the main body of information, that is representative of the main body of information; a plurality of accompanying data sets, which correspond respectively to the information regions, for controlling the information regions as individual control units; and a plurality of region data sets, which respectively define the accompanying data sets. Management is provided for each of the region data sets that is obtained by the division of the main body of information.

According to claim 3 of the present application, in the information service processor cited in claim 2, before the main body of information is employed, in order to provide for protection of copyrights and rights of the information provider, and for security of information and to prevent illegal use of the information, an information region of the main body of information that is being employed is understood in real time, and while the accompanying data for the information region manages the use of the main body of information, information is provided to the user. The region information that is being used is understood in real time, and the accompanying data for its region is employed to manage the use of the information.

According to claim 4 of the present application, in the information service processor cited in claim 2, to provide information using the information service unit, the information provider adds, to the information, data that indicates whether or not storage of the information in a storage device or a file device at a user location is permitted, and transmits the resultant information. When the storage of the information is permitted, one information service set is stored in the storage device or the file device for later use. When the storage of the information is not permitted, the information that is transferred is not stored in the storage device and the use of the information is limited to real time use only. Relative to provided information, a user's system must cope with a non-storage type information service that inhibits the temporary storage of information and a storage type information service that permits the temporary storage of information in a storage device or a file device before it is employed.

According to claim 5 of the present application, in the information service processor cited in claim 2, for each of the information regions of the main body of information, mode information is included that regulates a use type for the information region. According to the mode information, a determination is made as to whether or not information in the information regions is to be provided for free, or whether or not the information can be employed as an advertisement for the main body of information, such as a demonstration, and information is supplied to the user in accordance with the mode information. The regions of the main body of information are managed by control data that indicate whether or not the use of information is chargeable, or by data that is provided prior to the use of the main body of information and that indicate the information may be used for a free advertisement, such as a demonstration, to prompt users to employ the information.

According to claim 6 of the present application, in the information service processor cited in claim 2, for each of the information regions of the main body of information, copyright information is included that specifies the material which a copyright is claimed and provides for the management of information for the copyright. According to the copyright information, the use of each of the information regions is separately controlled. A copyright is not claimed that covers all the information as a single entity; each divided region is individually copyrighted, so that detailed copyright management and the supply of information is possible.

According to claim 7 of the present application, in the information service processor cited in claim 2, for each of the information regions of the main body of information, information concerning right of ownership and a right of employment are included for control of a transfer of the right of ownership and the right of employment. And the use of the information regions is controlled in accordance with the information concerning the right of ownership and the right of employment. With this arrangement, the information that exists in a user's system can be regulated for each region by determining whether or not the right of ownership has been transferred to the user by purchase, or whether or not the right of employment has been obtained from the provider. In this manner, the use of information can be controlled.

According to claim 8 of the present application, in the information service processor cited in claim 2, for each of the information regions of the main body of information, right of portrait information is included for claiming the right of portrait. And the use of the information regions is controlled in accordance with the right of portrait. Information concerning the right of portrait that of characters is included in the information regions, and with this information, for each information region the right of portrait can be managed.

According to claim 9 of the present application, in the information service processor cited in claim 2, for each of the information regions of the main body of information, existence form information is included that indicates an existence form for the information regions, with the information included in the information region being purchased information, copied information, retained information on temporary loan, or original information. For employment, the information regions are managed in accordance with the existence form information. For each information region the existence for information is specified with the information being purchased information, copied information, retained information, or original information, so that the information can be managed when it is used.

According to claim 10 of the present application, in the information service processor cited in claim 2, for each of the information regions of the main body of information, encryption information is provided to specify whether or not the information regions should be encrypted and to set an encryption type and an encryption key. And the use of the information regions is controlled in accordance with the encryption information. Thus, detailed information protection can be provided for a specific region in accordance with the requirement/non-requirement of encryption, an encryption type, and an encryption key.

According to claim 11 of the present application, in the information service processor cited in claim 2, for the information regions of the main body of information, abandonment process information is included to specify process methods to be used when the information regions are no longer required. When the information regions are to be abandoned, the abandonment process information is used. The information abandonment method is specified so that an appropriate process will be performed as a part of a suitable information security procedure. Therefore, it is guaranteed that no information will remain after the abandonment process has been completed.

According to claim 12 of the present application, in the information service processor cited in claim 2, for each of the information regions of the main body of information, log information is included to designate the requirement/non-requirement of a log in which are recorded a user, a provision date, a time and a purpose for use, such as merely for reference, for playback or for copying, when the information regions are used. In accordance with the log information, when a log is established, the log is so stored that the information provider or the user can refer to the circumstances during which the information region was employed. Each time the information is used, the recording of the circumstances concerning the use is instructed. When the information in the designated region is provided, a provision date, a time, a user and the purpose which used are recorded and stored. Upon request, the recorded data are transmitted to a user or to an information provider.

According to claim 13 of the present application, in the information service processor cited in claim 2, for each of the information regions of the main body of information, used information notification data is included to specify the information provider of log information when the information regions are provided for the user. When notification is instructed by the information notification data, the information provider is informed of the circumstances concerning the user of the provided information. When the notification of the employment of information to the copyright holder or the information provider is designated, each time or at the proper time, the copyright holder or the information provider can understand the situation where the information is used.

According to claim 14 of the present application, in the information service processor cited in claim 2, for each of the information regions of the main body of information, available space information is included to specify an available space for the information region. With the available space information, the information regions are used only in a specific terminal, device or network, or in a specific area. Since the provided information specifies the available space and the device, external leakage of information from a designated area and the illegal use of the information is prevented.

According to claim 15 of the present application, in the information service processor cited in claim 2, for each of the information regions of the main body of information, information level data is included to specify an available information level. With the information level data, an information service level, such as an image quality or a sound quality, is specified. Since the quality level for the information that is supplied by the information provider is specified, the image quality and detail, and the sound quality can be specified for each information region.

According to claim 16 of the present application, in the information service processor cited in claim 2, for each of the information regions of the main body of information, life span data is included to specify a life span for the information region. With the existence period data, the life span of information is specified, and there is information that is to be abandoned after being used once, after being used N times, or after the elapse of a predetermined period of time; or information that is effective until an instruction is received from the information provider; or information that is effective permanently. Since the effective life span of the provided information is specified, when the effective life span of the information is exceeded, the information will be erased or abandoned. In this manner, the security of the information is maintained.

According to claim 17 of the present application, in the information service processor cited in claim 2, for each of the information regions of the main body of information, usage charge data is included to specify a method by which to charge for the use of the information regions that are employed. With the usage charge data, a fee, a payment method and a payee are designated to specify a charge unit and a charge method. Since a charge method, which designates a payee, a payment method and a fee, is specified for each divided region of the main body of information, detailed charges can be prepared.

According to claim 18 of the present application, in the information service processor cited in claim 2, for each of the information regions of the main body of information, user data is included to specify a person who is permitted to use the information region. Only when the user data matches an ID of a user that is input by another method, the information region is permitted to be provided for use of the user. Since the management process specifies those users who may be provided information, information can be used only by users for whom access is permitted. Since a user can be designated for each information region, the detailed management and control of users is realized.

According to claim 19 of the present application, in the information service processor cited in claim 2, for each of the information regions of the main body of information, use condition data is included to specify the conditions that are to be satisfied before the information region is provided. Only when the conditions such as a provision date, a time and a permitted age, are established by the use condition data, the information region can be used. Since a period, a time and a user's age can be specified by setting the use conditions, partial information control relative to the employment of provided information is possible.

According to claim 20 of the present application, in the information service processor cited in claim 2, for each of the information regions of the main body of information, copy enable/disable data are included to specify whether copying of the information region is permitted or inhibited. All copying is prohibited for the information region for which copying is inhibited. Therefore, whether copying of information in the region is permitted or not can be determined.

According to claim 21 of the present application, in the information service processor cited in claim 2, for each of the information regions of the main body of information, copy condition data is included to specify a permissible range for copying. A copying process is performed within the permissible range specified by the copy condition data. When copying is permitted, copying conditions are specified for each region, and illegal copying of information that is provided is prevented, so that detailed copying control can be provided.

According to claim 22 of the present application, in the information service processor cited in claim 2, for each of the information regions of the main body of information, data is included that, when information in the information region is to be copied, determines whether or not accompanying data in the information region is partially changed and copied together with the information in the information region. When copying is designated, information for specifying the existence form of the information is changed, and the information in the information region is copied together with accompanying data. Since not only the main body of information but also the accompanying data are copied, the attributes of the information that is specified by the information provider can be inherited by the information copy. As a result, the illegal use of a copy, and a copy of the copy can be prevented.

According to claim 23 of the present application, in the information service processor cited in claim 2, for each of the information regions of the main body of information, information type data is included to describe the information types in the information region. With the information type data, speech information and video information can be identified so as to change the processing for the main body of information. Since the information type in the information region is specified, the use of that information can be controlled.

According to claim 24 of the present application, in the information service processor cited in claim 2, for each of the information regions of the main body of information, user authentication data is included to specify whether or not authentication of a user is required. With the user recognition data, high security is ensured relative to the providing of information from the information regions. When especially high security is required for part of the information, or when access of permission for information is to be precisely confirmed, authentication of a user can be performed.

According to claim 25 of the present application, in the information service processor cited in claim 2, for each of the information regions of the main body of information, designation data is included to determine whether or not the information region is to be transferred to an external network. Only an information region for which transfer permission is authorized by the designation data is transferred. The information that is provided by the information provider can be prevented from being leaked across the network by the user's system.

According to claim 26 of the present application, in the information service processor cited in claim 2, for each of the information regions of the main body of information, printing data is included to determine whether or not the information in the information region is permitted to be printed on a sheet of paper. Only information in the information region for which printing is permitted by the printing data is printed. Once information is printed on the paper, the endless copying of the information by a copy machine can not be prevented. Therefore, the printing of provided information is regulated to prevent unnecessary printing.

According to claim 27 of the present application, in the information service processor cited in claim 2, for each of the information regions of the main body of information, reprocessing data is included to determine whether or not to permit a user to read information from the information region and to reprocess the information for use. A user can freely reprocess and recycle information in an information region for which reprocessing is permitted, while reading to perform any process is inhibited relative to an information region for which reprocessing is not permitted. Since a prior determination is made to permit a user to reprocess and recycle provided information, illegal alteration and recycling of the information can be prevented.

According to claim 28 of the present application, in the information service processor cited in claim 2, for each of the information regions of the main body of information, resale data is included to specify whether or not resale of information in the information region is permitted. For information in an information region for which resale is inhibited, alteration of accompanying data concerning the selling of and the charges for information is inhibited and the resale activity is eliminated. Since it is determined whether or not the resale of information supplied by the provider is permitted, a resale activity whereby a user provides information for a third party and charges for it without the permission of a provider can be prevented.

According to claim 29 of the present application, in the information service processor cited in claim 2, for each of the information regions of the main body of information, alteration prevention data is included to prevent alteration of accompanying data that is used to control the main body of information. When the main body of information is altered, information for a single information service unit is regarded as invalid and is abandoned. In order to prevent the alteration of information related to the handling of information that is supplied by an information provider, sum check information is inserted into the accompanying data for each information region to provide a function for detecting alterations. When the alteration of information is detected, all of the information is regarded as invalid.

According to claim 30 of the present application, in the information service processor cited in claim 2, the region data includes connection data for the information region by which to specify the order in which a series of the information regions are to be used. The region manager and the utilization manager control the information utilizer to furnish the information regions in the order that is specified. In order for all the information provided by the information provider to function correctly, the order in which the divided information regions of the main body of information are to be supplied is specified.

According to claim 31 of the present application, in the information service processor cited in claim 2, the attribute data includes a plurality of sequence data sets as information for specifying a sequence to be employed when the information regions are to be provided. According to the sequence data, a plurality of information sets are provided from a single main body of information. By employing a plurality of sequences for providing information, various types of information can be provided.

According to claim 32 of the present application, the information service processor cited in claim 2 further comprises an information generator that is connected between the terminal peripheral unit and the file device. For original information with no accompanying data, the information generator automatically generates a frame for an accompanying data row, and prepares, for the storage device, an information frame with which a new single information service unit, with accompanying data, can be provided. When an information user or a user system serves as an information transmitter and provides information, an information frame is generated that is consonant with information control proposed by the present invention.

According to claim 34 of the present invention, in the information service processor cited in claim 2, under the control of the utilization manager, the information utilizer synthesizes information in a plurality of information regions, and transmits the resultant information to the terminal peripheral unit in order to simultaneously provide the information for the plurality of information regions. Since the information regions of the main body of information are synthesized and the resultant information for the information regions can be simultaneously supplied to a user, long video information presentations that are provided can be searched within a short time.

According to claim 35 of the present invention, in the information service processor cited in claim 2, when video information is to be used in a mute mode, a sound recognition function of the information utilizer converts speech information into character information, and superimposes it as characters on a part of the video information display, so that the audio accompanying image can be understood in the mute mode. Since the speech information is converted into characters by speech recognition and the characters are displayed on a screen, the audio accompanying images can be understood.

According to claim 36 of the present invention, in the information service processor cited in claim 2, part of the accompanying data for each of the information regions that accompany the main body of information is superimposed on one part of a screen to display charge data and provision conditions for a user. One part of the accompanying data is displayed, on a screen, as a divided region of the main body of information, and a user can understand what is permitted and is inhibited for the region. As a result, illegal activities by the user are prevented, and charge data is displayed to provide information for a user who is executing a contract with an information provider.

According to claim 33 of the present invention, in the information service processor cited in claim 32, the information generator receives from the terminal peripheral unit a main body of raw information that has no region data and no accompanying data, divides the main body into a plurality of information regions, generates a frame for the region data and the accompanying data and adds the frame to the main body of the raw information, and transfers the resultant information to the file device. With this structure, as an information transmitter, the user of the present processor can transmit information that is prepared by the information generator across the network to another user. In this case, the copying and alteration of information can be prevented, the number of users who receive information can be limited, security of information can be ensured by encryption, and information can be provided as charge data.

BRIEF DESCRIPTION OF THE DRAWINGS

These objects and features of the present invention will become more readily apparent from the following detailed description of the preferred embodiments taken in conjunction with the accompanying drawings in which.

DETAILED DESCRIPTION OF THE INVENTION

Figure 1:
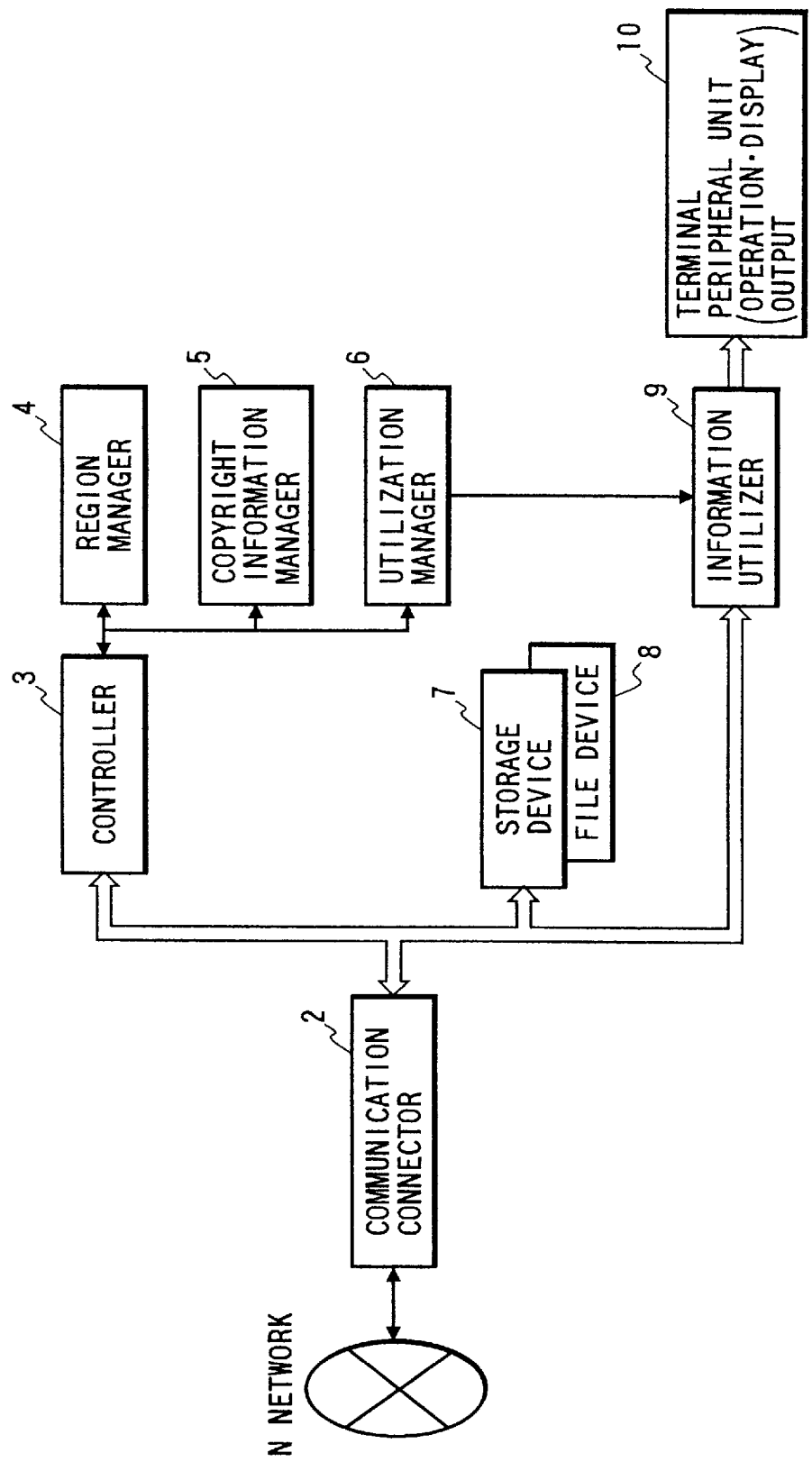
FIG. 1 is a block diagram illustrating an information service processor according to a first embodiment of the present invention.

The embodiments of the present invention will now be described while referring to the accompanying drawings. FIG. 1 is a diagram illustrating the arrangement of an information service processor according to a first embodiment of the present invention. As is shown in FIG. 1, the information service processor comprises: a communication connector 2, which is connected to an external device, such as a network N across which information is provided; a controller 3, for controlling the operation of the entire information service processor; a region manager 4, for managing and controlling in real time whichever divided region of provided information that is currently being used; a copyright information manager 5, for managing and controlling information concerning copyrights; a utilization manager 6, for controlling the application of provided information and its correct use; a storage device 7 and a file device 8, for storing information that is provided via the communication connector; an information utilizer 9, for controlling a main body of information when a user uses the information; and a terminal peripheral unit 10, for displaying for a user information supplied by the information utilizer. The network N is a telephone line, a facsimile line, a data line, or a communication broadcast line for the transfer of data, such as the Internet, a LAN, or a broadcast satellite. A CPU (central processing unit) is used as the controller 3, and various programs are stored and a microprocessor is mounted to perform various information services. The terminal peripheral unit 10 is a CRT display terminal or another device, such as a personal computer, a workstation or a printer, that has a keyboard and a display by which to input instructions and to output and display data. In the information service processor of the present invention, the terminal peripheral unit 10 serves as an operation and display output means.

Figure 2:
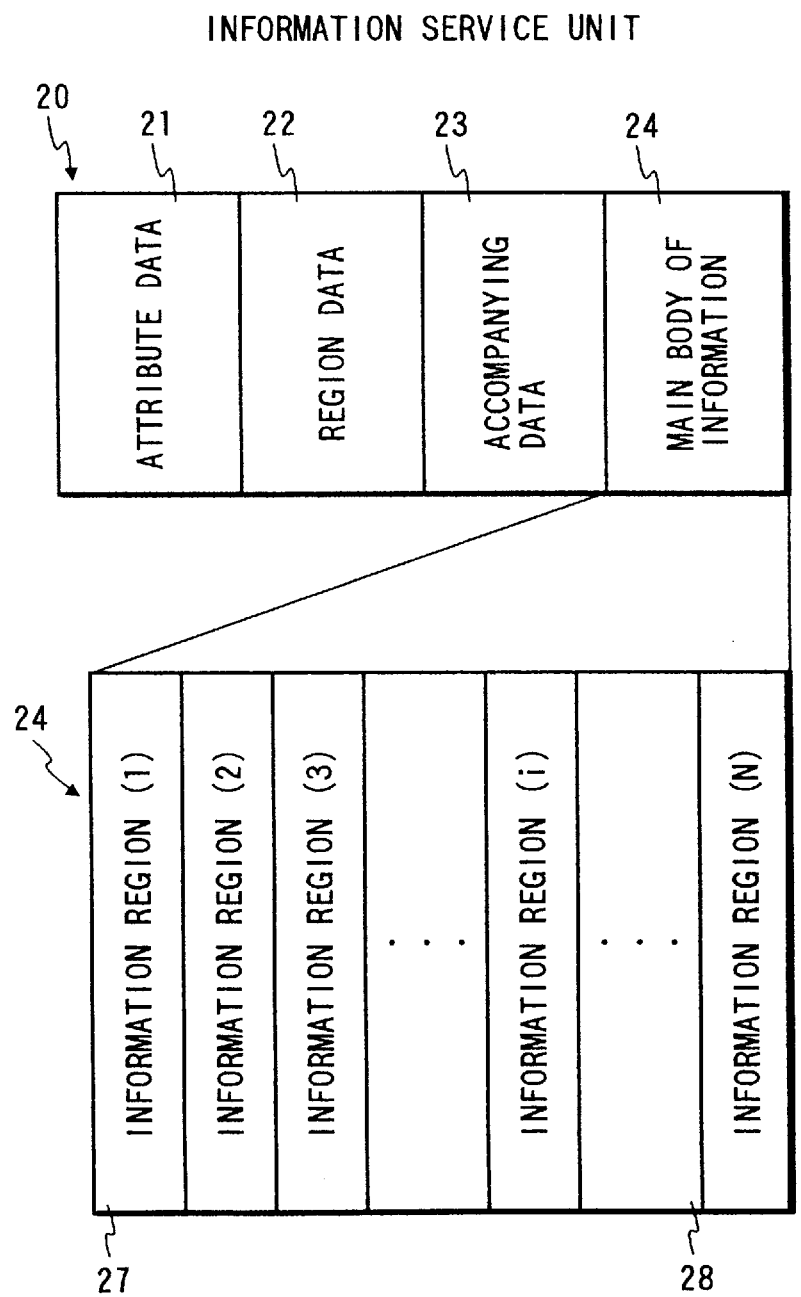
FIG. 2 is a diagram illustrating one information service unit that is provided by an information provider according to the first embodiment of the present invention.

FIG. 2 is a diagram showing the structure of a single information service unit 20 that is supplied by an information provider. The information service unit 20 includes: a main body of information 24, which has N divided information regions from (1)27 to (N)28 that are provided externally; accompanying data 23, which consist of N accompanying data sets from (1)25 through (N)26 that correspond to the information regions; region data 22, which has an address pointer for the accompanying data 23; and attribute data 21, which include all the attributes for the main body of information 24.

Figure 3:
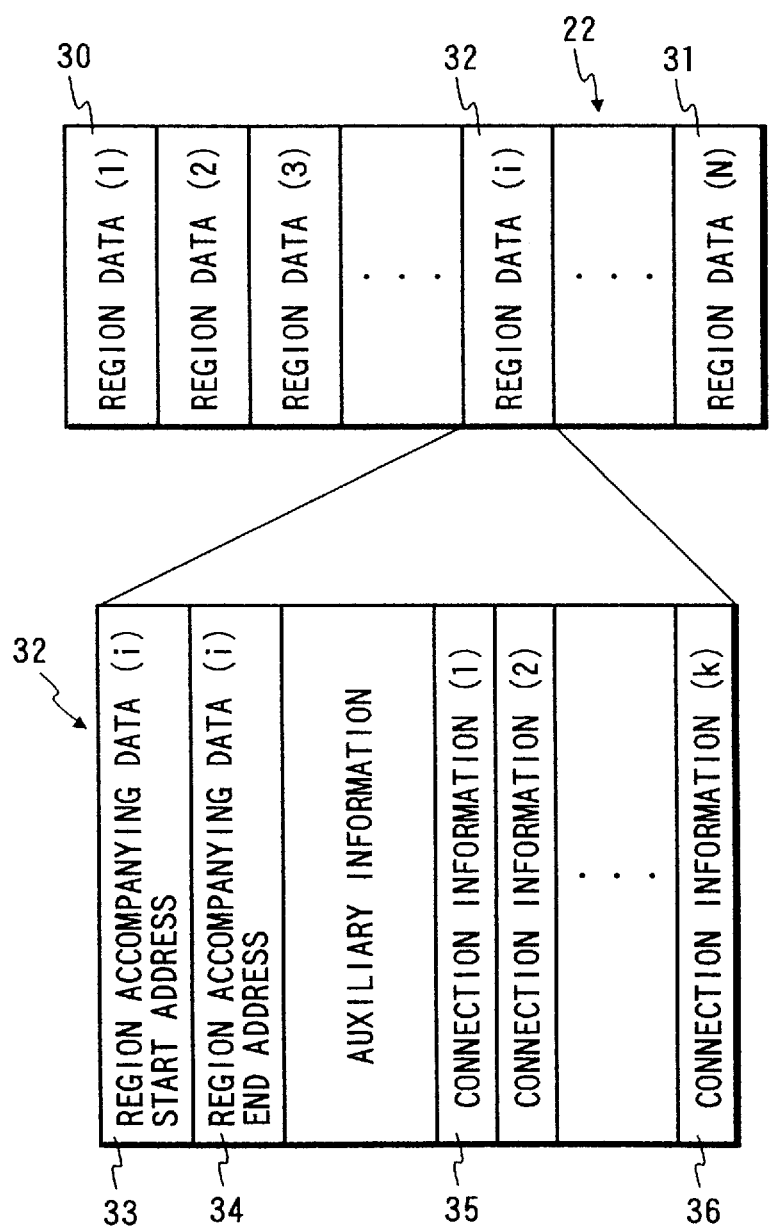
FIG. 3 is a diagram illustrating a region data structure that constructs one information service unit according to the first embodiment of the present invention.

FIG. 3 is a diagram showing the structure of the region data 22 shown in FIG. 2. Each of the region data sets 32, (1)30 through (N)31, has a start address pointer 33 and an end address pointer 34 for corresponding region accompanying data, and k connection information sets, (1)35 through (k)36.

Figure 4:
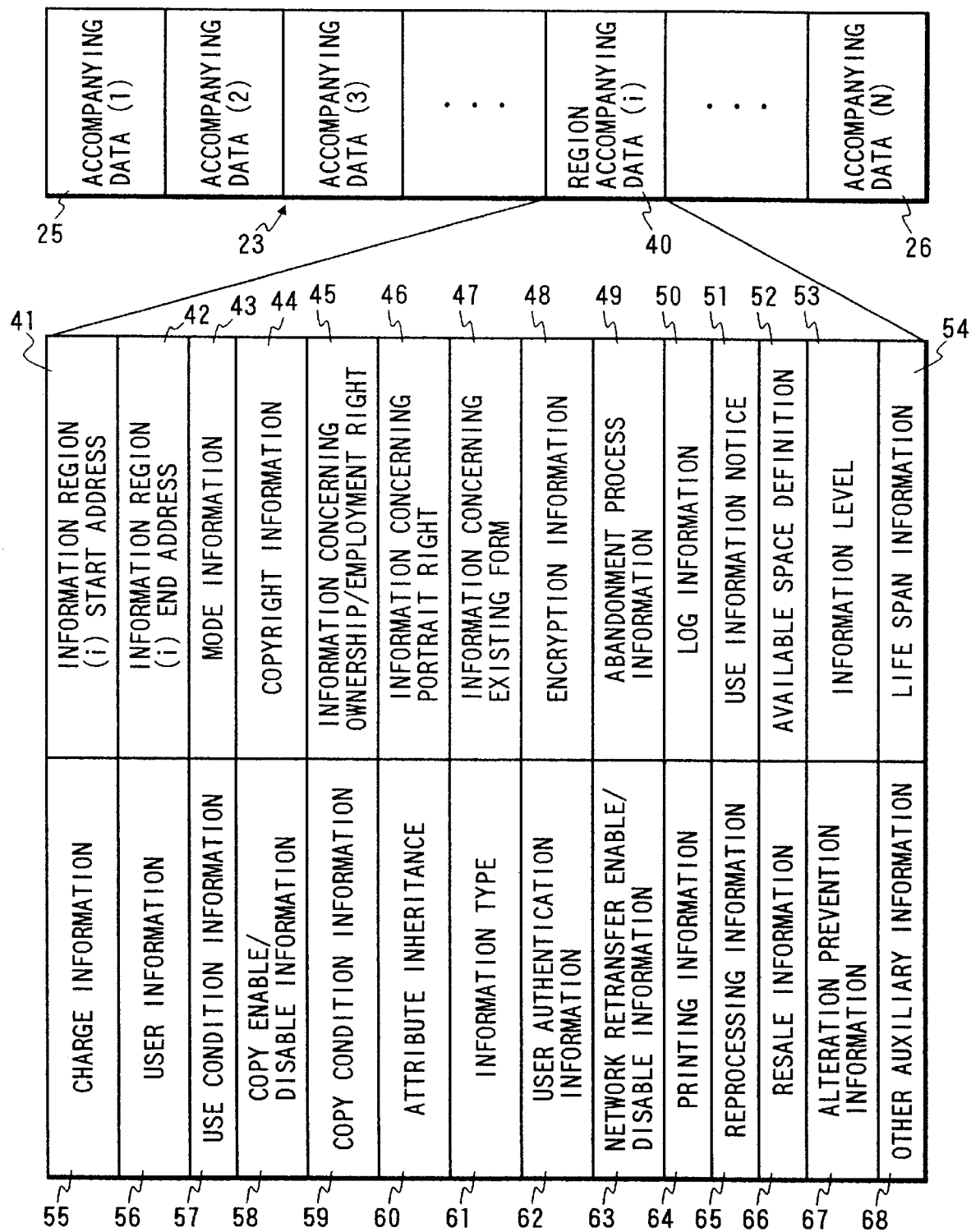
FIG. 4 is a diagram illustrating an accompanying data structure for controlling a region according to the first embodiment.

FIG. 4 is a diagram showing detailed functions 41 through 68 of the i-th region accompanying data 40, as an example, from among the N accompanying data sets, from (1)25 though (N)26, that compose the accompanying data 23 shown in FIG. 2.

The operation of this embodiment will now be explained. From a single information service unit that is transmitted across the network by an information provider and is received via the communication connector 2, the attribute data 21, the region data 22 and the accompanying data 23 are stored in the storage device 7. The attribute data 21 designate whether or not storing of the main body of information 24 is permitted. When storing is permitted, the entire main body of information 24, which is transmitted following the accompanying data 23, is stored in the storage device 7 or the file device 8. When storing is not permitted, since the information is provided without being temporarily stored, the main body of information 24 is transferred from the communication connector 2 directly to the information utilizer 9. The controller 3 and the region manager 4 monitor the received main body of information, and the region data 22 and the accompanying data 23, which are stored in the storage device 7, while they understand in real time a region in the main body of information that is currently being used, and specify the accompanying data in the relevant accompanying data 23. While referring to the specified region accompanying data 40, the controller 3, the copyright information manager 5, and the utilization manager 6 control the main body of information 24 that is transferred to the information utilizer 9 in accordance with the detail functions 41 through 68, and transfer the information to the terminal peripheral unit 10, so that a user can receive information service.

When the storing of information in the storage device is permitted, all information is temporarily stored in the storage device or in the file device. Then, when a user uses the information, the controller 3 loads the attribute data 21, the region data 22, and the accompanying data 23 from the storage device 7. After the main body of information 24 has been called from the file device under the control of the controller 3 and the region manager 4, it is sequentially transferred to the information utilizer 9. The following operation is performed in the same manner as is described above. Since the accumulation type information can be employed in this case, the sequence in which information is supplied can be freely controlled. The connection information 35 in the region data 32 designates a region that is to be conducted next to the current region. In accordance with this operational order, the playback of the main body of information is advanced. Since a plurality of connection information sets (k sets in this embodiment) are included in a single region data set 32, k different execution sequences can be set for the main body of information. When, for example, the main body of information represents a movie, with the above described function, scenes that are to be cut for an advertisement are separated and these regions are linked together by the j-th connection information for the preparation of a demonstration sequence. Then, a user need only select the j-th connection sequence to provide a free demonstration sequence as an advertisement for a movie for which a fee is charged. When the main body of information represents a drill book for education, effective drill can be prepared and provided from a single main body of information. A total of n different courses, from the advanced to the beginner, are prepared in consonance with the level of students, and are programmed as connection information sequences. When a student does not understand a part of the study, he or she can change the course to an easier one, and can receive a detailed explanation and continue studying.

The function and the operation of the accompanying data 40 will now be described. The accompanying data 40 has component function information, including the information region (i) start address 41 through the other auxiliary information 68. The accompanying data for a region that is being operated is stored in the storage device 7. The element function information concerning the information regions is interpreted and controlled by the region manager 4; the element function information concerning a copyright is interpreted and controlled by the copyright information manager 5; and the element function information concerning the use of information is interpreted and controlled by the utilization manager 6. The information region (i) start address 41 and the end address 42 indicate the i-th information region in the main body of information 24, and the following element function information sets are applied for that region.

Mode information 43 specifies whether or not the information in that region is free. When the information is not provided free, a fee is charged by referring to copyright information 44, ownership/employment right information 45 and charge information 55. The copyright information 44 includes all the copyrights and the copyright holders that are related to the pertinent region, and is referred to when the copyright processing is performed. The ownership/employment right information 45 includes all of ownership rights and ownership holders, and all the rights of employment and their holders that are related to the region, and is referred to when the ownership right processing or the processing for the employment right is performed. Information 46 concerning a portrait right includes information required for the processing for a portrait right that is related to the region, and is referred to when the processing for a portrait right is performed. Existence form information 47 determines whether the main body of information for the region is an item sold to a user, a copy prepared by a user, a rental from an information provider, or an original item prepared by a user. In association with the ownership/employment right information 45, whether a user has purchased information including the ownership right, or information for which only the employment right is allowed is defined. When the conditions for using the information are not specified, with the existence form of the information, use of the information is permitted within a common sense range. For example, serial copy management for private use is applied. Since all the members in the network can be information providers as well as information transmitters, regulation of the original is provided to ensure a degree of freedom for a user to edit and alter the information during the information generation process. When this information is to be supplied to a third party, the article for the original information is deleted and the information is transferred.

Encryption information 48 includes information concerning whether or not information in the region is encrypted, and an encryption type and an encryption key if the information is encrypted. Since the encryption method and the key can be changed for each region, the encryption level is altered in consonance with the importance of the information, and a copyright holder and an information provider can employ their own encryption. The encryption information 48 is transferred to the information utilizer 9 to decrypt the main body of information. Abandonment information 49 specifies a process for abandoning the information of the region when it is unnecessary. The abandonment process is performed when an abandonment instruction is issued, when an information available period that is specified by the existence period information 54 has expired, and when illegal use by a user has occurred. In the abandonment processing, meaningless information is written over in the region where the information is present and the information is completely erased. When the abandonment information 49 includes an instruction for returning information, prior to abandonment, information is returned to an information supply source. The intent of the return is the confirmation that the information was not altered, and the acquisition of the circumstances concerns the use of the information. If the abandonment information 49 includes an instruction to issue a notice of abandonment, after the information is abandoned, a notice of abandonment is transmitted to the information supply source.

Log information 50 is used to instruct whether or not a log of the circumstances concerning the use of information in the region should be acquired when the information is employed, and to designate a notification destination. When there is such a designation, user logs, in which a date, a time, a duration and the purpose for the use are recorded in a region of the other auxiliary information 68. The recorded logs are provided, for copyright holders, information providers and users, as confirmation information for charges, as marketing information for an information provider, or as use confirmation information. A log when an illegal access has occurred is also recorded. Use information notice 51 determines whether or not a notice should be issued to a copyright holder, an information provider and a user when the information in that region is used, and designates the timing for issuing the notice. If, for example, notification at the end of the month is designated, based on the log information, the monthly employment circumstances are reported at the end of every month. A system that reports such employment circumstances can prevent illegal use and illegal access in advance.

Available use regulation 52 specifies an available space for the information. An available position for a user is specified by the definition of space, such as the designations of a usable terminal number, a server name and a network name, and by using positional information that employs GPS information or a network address, and local area information that employs telephone numbers and addresses. The use of the information is not permitted in an area other than the specified space. In this manner, the use of information from a remote area and illegal access can be prevented, and the security of information is ensured. This can be utilized to prevent the leakage of in-house information and of information concerning privacy. Since a conventional network system is a closed internal network in a company or an organization, security it from an external invasion is not a matter of much concern. However, since a network at the information society is assumed to be open, protection against illegal invasion and illegal access must be strengthened. The protection of information by specifying the available space is proposed for use for such a purpose.

An information level 53 is a regulation for a sound quality that is represented by a number of bits when the information is sound, and a video quality that is represented by a resolution and an aspect ratio when the information is a video image. When the source of information is manufactured at as high a quality as possible, therefore, a quality charging method is realized whereby a fee is charged for information that is distributed across a network that is consonant with the provided image quality, or whereby the information is distributed at a high quality across the network and a fee is charged in consonance with the quality level of the terminal that a user employs. To control the quality of information, the controller 3 identifies the information level of the employed terminal peripheral unit 10, and the utilization manager 6 selects, from the information level 53 region, control information that corresponds to the information level. The control information is transmitted to the information utilizer 9 which converts the information quality.

The existence period information 54 specifies a period wherein the information in this region is available by a user's system. The information can be designated as being effective for one use only, effective for use N times, effective during a certain period, permanently effective, or effective until a user abandons the information. When a designated period expires, the abandonment process is performed and the main body of information is lost. In a conventional information service system, once the information is transmitted to the user, it can not be controlled or managed by an information provider. Therefore, important information or expensive information is not transmitted to a user. However, with the existence period information of this invention, so long as the information is correctly used and collected, new information services can be provided. The following service, for example, can be realized. In the same manner as when borrowing movie video tapes, a certain movie is borrowed on a daily basis across a network and is automatically abandoned and erased when a specified number of days have passed. Another information service which adopts an employment count method can be realized. For three members in a family who desire to watch a movie across the network, the abandonment information 49, the log information 50 and the existence period information 54 are used in parallel. Until the information is used three times, the information can be used, regardless of the length of the period.

The charging information 55 is the regulation concerning charges. The details of a charging method, a fee, a payee and a payment method for each service are defined. The copyright information manager 5 charges a fee by referring to the charging information 55. According to a conventional network information service, a fee is charged roughly, such as for one movie or for one set of information documents. According to the present invention, however, since a fee can be charged for each service by the region unit, a detailed fee can be charged, such as a fee for copying only the theme music for a specific scene in a movie, or a fee for printing a table or a diagram on a specific page in a document. Further, when copyright holders and information providers differ, depending on the regions and the charging method, the fees differ accordingly, and a charging service for each right holder can be performed.

User information 56 specifies a user. When users are to be managed precisely relative to the use of provided information, users who have applied for the information service are registered, or an information provider specifies users to whom to provide information. Then, the users are regulated by means of the user information 56 and information is furnished to these users. The user information 56 is referred to and managed by the utilization manager 6. The control information is transmitted to the information utilizer 9 to manage the users in accordance with the regions. Therefore, a bank, for example, provides the following service. When a bank sends a monthly report, including their advertisement, to customers, the balances of all the family members are distributed at the same time. A region is provided for a balance sheet for each family member, and each family member is designated by the user information 56. Then, even when all the family members read the same bank report, they can not see any balance sheet other than their own. Further, when, for the existence period information 54, information is identified for abandonment after being used one time, a function can be provided whereby a user can abandon a balance sheet after he or she has checked it, so that secrecy can be maintained. Since users are specified for each region, while like information is provided for many users, the privacy of the individual users can be maintained.

When available information is set for a region for use condition information 57 and the condition does not match, the use of the information can be inhibited. There are two ways for setting the use condition information 57. One is a method whereby an information provider sets the information 57 in advance, and the other is a method whereby a user sets the use condition when the information is stored in the user's system. The use condition information 57 is referred to and managed by the utilization manager 6. The control information is transmitted to the information utilizer 9 to supply information. Using the movie service as one example of the former method whereby the information provider sets the use condition, one region is set for a movie scene, such as a scene of sexual intercourse or of violence, that is not preferable for children, and adults are designated in that region as the use condition. As a result, when a user younger than 20 years old is watching the movie, the scene in question is skipped and thereafter played back. Using a game information service as one example for the latter method whereby a user sets the use condition, parents designate a period, such as one to six o'clock in the afternoon on a weekend, during which children are permitted to play games. As a result, the children can be prevented from continuing to play the games. The use condition information 57 is effective when the use of information is partially limited or controlled.

Copy enable/disable information 58 specifies whether or not copying of the information in this region is permitted.

When the copying of the information is inhibited, a user can not copy the information in this region. The copy enable/disable information 58 is referred to and managed by the utilization manager 6, and the control information is transmitted to the information utilizer 9 to control copying. When document information includes a part that is not to be copied by a user, inhibition of copying is set in this region. When a user copies all the information, the inhibited area can not be copied, so that partial copying control is possible. Copy condition information 59 specifies copy conditions when the copying is permitted with the copy enable/disable information 58. One of the copy conditions concerns copy media. For example, a condition can be set that does not permit the copying of information to a digital copy machine but that permits copying to a analog copy machine. The second copy condition not only specifies whether a main body of information can be copied but also it can be copied together with the accompanying data 40. Thus, the attribute of the main body of the original information can be inherited by an information copy. The limitation for users and a charging method can be also applied to a copy, and the inhibition of information transfer to a network and the inhibition of reproduction can also be inherited by a copy. In this case, the copy condition information 59 is used in parallel with an attribute inheritance 60, which will be described later. The third condition is used to specify a user who is permitted to copy information. Since the user is designated, a third party can not copy information. The fourth condition concerns the application of the copying process. Copying one time is permitted but the copying of a copy is not permitted. Further, the existence period information 54, the available space definition 52 and the attribute information 60 are set in parallel with the copy condition 59, so that a period where a copy is effective is specified and an available space is defined to permit copying. The copy condition is identified and managed by the utilization manager 6 and the control information is transmitted to the information utilizer to control copying.

The attribute inheritance 60 is employed for the inheritance of the attribute of the main body of information by an information copy. When copying, the attribute inheritance is designated by the copy condition information 59, and an item of the accompanying data 40 to be inherited and an item to be updated are determined. When, for example, information items concerning a copyright and a charging method are inherited, protection of the copyright and a correct charging method are employed when an information copy is used. When information concerning the copying is inherited, correct copying control is performed on the information copy. When, for example, a serial copy management that permits the copying of a copy is performed, the existence form information 47 of the accompanying data 40, which is attached to a copy, is changed to an information copy, and the inhibition of copying is set in the copy enable/disable information 58. With the control provided by the attribute inheritance 60, an information service can be achieved that, while a considerably high degree of freedom is maintained, maintains the security of information and prevents illegal use. An information type 61 specifies the types of the main body of information in this region. This specifies types of character information, image information, sound information or video information, and a method, such as an information compression method, that is required for reproducing information. The information type is identified by the utilization manager 6 and the control information is transmitted to the information utilizer 9 to reproduce the main body of information. Since control of the information depends on the types for each region, information sets that are supplied from various information sources are combined to construct the main body of information. For example, video information sets of MPEG1 and MPEG2 and non-compressed video information can be mixed to construct the main body of information.

User authentication information 62 is a record of an ID and a control of the input of an ID when authorization must be provided for a user before information is used. This information is used to input a higher ID of a user or to authenticate a sales contract in order to ensure high security. In either case, when the utilization manager 6 can not identify a correct input, it inhibits the advance to the next step. Network retransfer enable/disable information 63 is used to determine whether or not a user can retransfer provided information to a network. When it is determined that the retransfer is enabled, a user may retransfer the main body of information to the network. When the retransfer is disabled, a user can not transfer information to the network. For a catalog or advertisement material that it is preferable be known by as many people as possible, the retransfer is permitted. However, information in which a copyright is included should be inhibited from being retransferred across the network, so that the retransfer of such information is inhibited. Since the network retransfer enable/disable information 63 is identified by the communication connector 2, the information concerning the retransfer can not be passed through the communication connector. Since the retransfer of not only the whole information but also of information for each region can be controlled, a special price is specified for certain customers in a goods catalog that can be retransferred, and only that portion is set to inhibit the retransfer. In this manner, the special price can be prevented from being displayed to a third party.

Printing information 64 is used to specify whether or not printing is permitted. Once information is printed on a sheet of paper, it will be copied from paper to paper by using another copy machine. Thus, the inhibition of printing is set for information that should not be distributed by paper. Since a region of information is also designated in this case, printing of a document can be partially inhibited. When the printing information 64 is used in parallel with the attribute inheritance 60, all the information is copied to another medium, the printing using the medium is inhibited, and the security of information is therefore ensured. The printing information 64 is identified and managed by the utilization manager 6, and the control information is transmitted to the information utilizer 9 to control the printing. Reprocessing information 65 specifies whether or not a user may process provided information. Since alteration of information that includes a copyright infringes the right, the reprocessing is inhibited. The main body of information for which reprocessing is inhibited can not independently be loaded in the storage device unless it is used correctly according to allowed use. Information can not be written in a region of the file device or of the storage device in which is stored the information for which reprocessing is inhibited with the reprocess information 65. The reprocess information 65 is identified by the utilization manager and the controller 3, and the region manager 4 prevents the reprocessing of information.

Resale information 66 specifies whether or not a user can re-sell provided information. Since, in a network society, any user can price his or her own information and sell it, information, other than original information, that is obtained from others must be prevented from being sold to a third person. When the resale is inhibited with the resale information 66, the contents of the accompanying data 40 can not be changed. As a result, the use environment and a condition that is set by an information provider, the charging method and the copyright information can not be changed, and a user can not sell this information. To cope with illegal use, such as the resale of information obtained from others, various types of safety keys are provided by using the resale information 66 in parallel with the reprocess information 65, the network transfer enable/disable information 63, the copy enable/disable information 58, the user information 56, the available space specification 52, the abandonment information 49, and the encryption information 48. Therefore, information that includes a right can be protected with high security, and illegal use can be prevented.

In alteration prevention information 67 is included information, such as a sum check, that is generated to detect alteration of the main body of information and the accompanying data 40 for this region. Especially, the alteration of the accompanying data 40 constitutes the illegal use, and in this case, the information is abandoned. The other auxiliary information 68 is used to store log information for a region or to apply time information for controlling the employment of the region.

As is described above, in this system, the contents of the accompanying data 40, i.e., the functions from the information region (i) start address 41 to the other auxiliary information 68 and their combinations, provides security for supplied information, a correct charging method and prevention of the illegal use of information, and realizes a variety of information services.

When a plurality of regions need be synthesized and displayed according to an instruction from a user, the controller 3 instructs the region manager 4 and the utilization manager 6 to synthesize the region information sets. The utilization manager 6 instructs the information utilizer 9 to synthesize a plurality of regions The region manager 4 reads the accompanying data 40 for the determined regions from the storage device 7. The utilization manager refers to the accompanying data 40 and sequentially reads the information for the regions. The read information is synthesized by the information utilizer 9, and the synthesized information is transmitted to the terminal peripheral unit 10 to be displayed for a user. In a one-hour movie that has 100 scenes consisting of 100 regions, a search mode is prepared, and reduced animated images for 20 screens are synthesized and displayed on a screen at one time. Then, the display is switched five times, and the one-hour movie can be checked only for one or two minutes. For information on a document, so long as one region is set for each page, a plurality of regions are displayed on one screen, so that an image can be searched for efficiently. in either case, since the regions are played back according to the accompanying data 40, a region that does not match the use condition will not be displayed.

The accompanying data 40 is normally stored in the storage device 7. The utilization manager 6 refers to and identifies the accompanying data 40, and controls the main body of information based on the data 40. When a user has to know the contents of the accompanying data 40, according to an instruction from the controller 3, the utilization manager 6 transfers control information to the information utilizer 9 and edits the accompanying data 40, which are stored in the storage device 7. The edited data can then be transferred to and displayed by the terminal peripheral unit. A user can check the contents, such as the copyright information, the charging information, the use condition and the copy condition, that are permitted for use.

Figure 5:
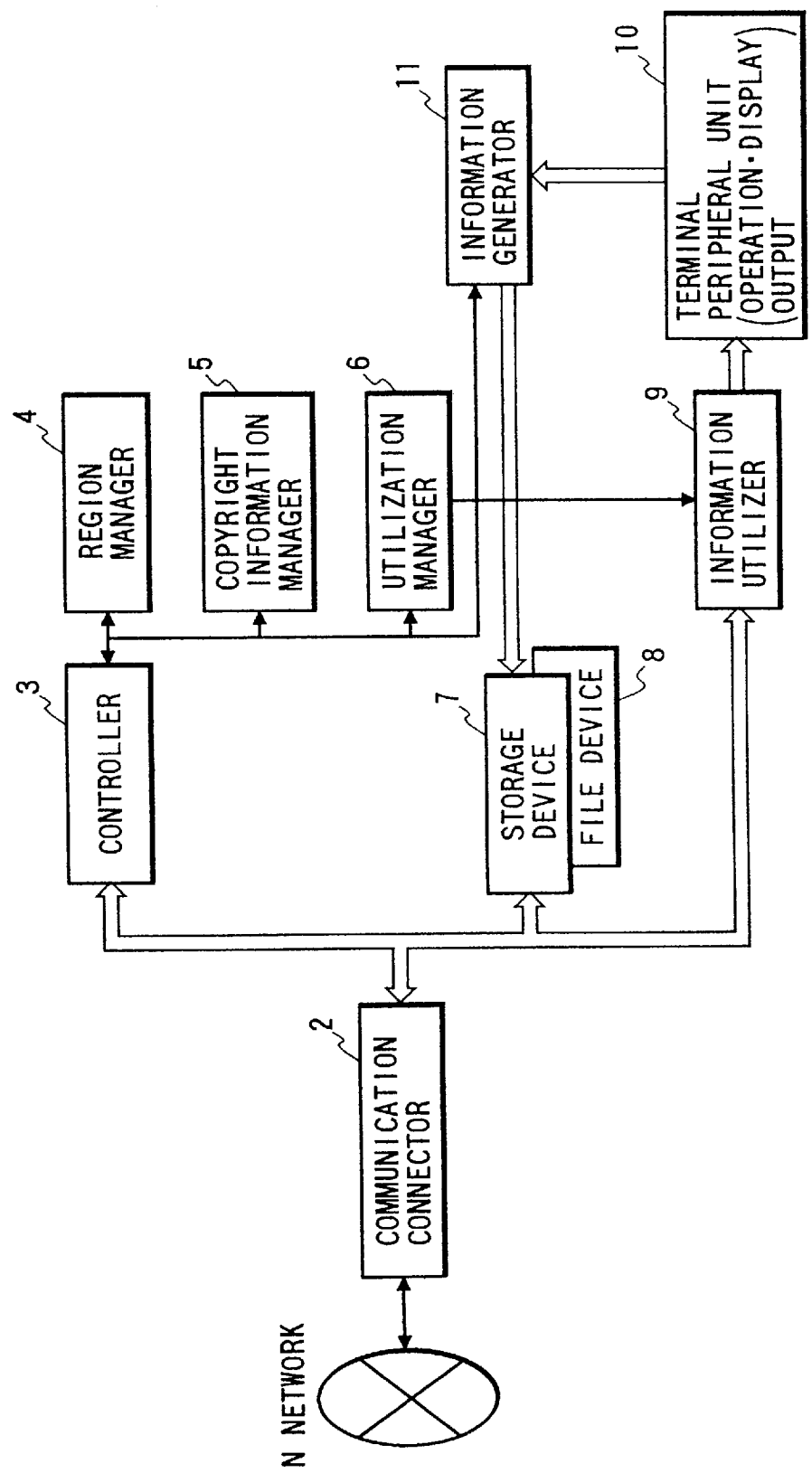
FIG. 5 is a block diagram illustrating an information service processor according to a second embodiment of the present invention.

FIG. 5 is a diagram illustrating an information service processor according to a second embodiment of the present invention. The same as for the first embodiment shown in FIG. 1, the information service processor comprises: communication connector 2, which is connected to a network N; a controller 3; a region manager 4; a copyright information manager 5; a utilization manager 6; a storage device 7 and a file device 8 for storing various data; an information utilizer 9; and a terminal peripheral unit 10 that displays data for a user. In the second embodiment, in addition to the above components, an information generator 11 is included, with which a user can employ the system of the present invention or can prepare information to be provided for the others. The information generator 11 is connected to the terminal peripheral unit 10, and also to the storage device 7 and the file device, so that data can be written to and read from them. In addition, the information generator 11 is connected to the controller 3, which controls its operation.

With this arrangement, when a user prepares information that is to be used in this system, the information generator 11 reads, from the terminal peripheral unit 10, a main body of the original information that is created by a user, and generates, in accordance with the setting of regions, frames for one information service unit 20, attribute data 21, region data 22, accompanying data 23, a main body 24, and accompanying region data 40. Thus, in the same manner as a user prepares and transmits electronic mail, a user can serve as an information provider and can supply information. Since the information for copyrights, use conditions, a charging method and the control of copying can be set, a user who is not an information service expert can supply a high level information service. Therefore, it is possible for an individual store owner to supply information or to provide advertisement information to his customers, or for individuals to sell their own information across a network to a unspecified majority of people that need the information. As was previously described, illegal use is prevented that involves the transmission by a user, as his original data, information that is obtained from others.

As is explained in the above embodiments, according to the present invention, provided is a network society wherein all the owners of the terminal peripheral units 10 that are connected to the network N can be users of information and can also be information providers. According to the conventional technique, once information is transmitted from an information provider to a user by broadcasting or across a network, the information provider can not manage the information at all with respect to the protection for copyright holders, the security of information and the prevention of illegal use. A set of information has a simple structure and does not include a variety of copyright holders and information providers, and information itself is formed with a single format. Similarly, a charging method is performed in a rough manner whereby a fee is charged for one set of information. In the multimedia era, however, with such a simple information service, more development seems difficult with respect to the protection of various rights, the security of information, and a variety of information services. The present invention resolves these shortcomings, and provides the following effects or advantages.

First, an information set that is provided for a user can be constructed by using information from many copyright holders. An information set is divided into multiple regions, and the regions include different copyright information and processing. Further, since different charging processing and use conditions can be set for each region, a charging method that is consonant with the use condition of a user can be performed directly for a right holder. In addition, information for which the encryption method and the compression method differ is used for each region, and various information types can be included in the information set, and various items of multimedia information from many copyright holders can be employed unchanged to construct the entire arrangement of information.

Second, an information provider can manage information that is supplied to a user. The use condition, illegal use, the charges, and the security of information are monitored relative to the provided information, and as the information provider understands the management, the information provider can supply information without any worry. The management of provided information is required to protect copyright holders and the rights of the information provider. It is important for the information society to provide satisfactory circumstances for an information provider.

Third, illegal use can be prevented and can be detected. The conventional information service has no method for detecting the illegal use of information. This is because the correct use and the inhibited use of provided information are not defined, and the use of information is not monitored. In the present invention, for an information set that consists of many pieces of copyright information, the use conditions for each item of copyright information, e.g., a correct use range and what use of the information is permitted, can be set by an information provider, and the use conditions can be managed. A use that is not permitted under these conditions is detected as illegal use, and a warning is issued to a user. At worst, information can be automatically abandoned. Illegal use is, for example, the use of an unauthorized space, the use by an unauthorized user, the use that is validated according to the use conditions, such as a time and an age, the unauthorized copying of information, the alteration and reprocessing of information., the retransfer of information to a network, and the unauthorized printing of information.

Fourth, as effects that are obtained by the security of information, the prevention of illegal use, the monitoring of the correct use, and the setting of use conditions, information concerning storage types can be employed by the user. According to such an information service that provides for lending and use, in the same manner that a rental video film is watched and then returned, information is borrowed through the network and is stored in a user's file to be used when necessary. Thereafter, the information is either automatically erased or returned.

Fifth, a variety of information services are possible. Service forms that are consonant with information providers and users are possible, such as detailed designation of a user, inhibition and permission of partial copying and printing, the setting of a fee and a charging method for each region, a charging method in accordance with employed information quality, information supply by setting an available period, and information supply in accordance with an employment count.

Sixth, all of the information users at terminals can be information providers. A user can price his or her own information and attach use conditions, and provide or sell it across a network. To realize such a system, the infringement of the copyright information by a third party must be detected and prevented as in the present invention. Otherwise, the information including copyright material will be distributed across the network, which is not preferable.

As is described above, according to the present invention, an information set that is to be supplied to a user is formed of information belonging to many copyright holders. The information is divided into multiple regions containing different copyright information and processing, and for each region, a different charging process is performed and different use conditions can be set. Therefore, a charging process that is consonant with the use conditions of the user can be performed directly for a right holder.

An information provider can manage provided information. The management of the use conditions, the management (prevention or detection) of illegal use, the management of the charging, the security of information, etc., are performed relative to the provided information. The information provider can supply information with assurance. Various service forms that are consonant with an information provider and a user can be provided, such as the detailed user designation, the inhibition or permission of partial copying and printing, the setting of a fee and a charging method for each region, a charging method in accordance with the quality of the employed information, information supply by setting an available period, and information supply in accordance with an employment count.

Further, all of the information users can be information providers. Various information service processes can be performed whereby a user can price his or her own information and can attach use conditions thereto, and supply or sell it across the network.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An information service processor comprising:

a communication connector, connected to a network, for receiving an information service unit consisting of a main body of information and accompanying data that are provided by said broadcast communication means;

a copyright information manager for handling copyright information from said information service unit;

a utilization manager for managing utilization of said information service unit by said user;

a region manager for managing said main body of information;

a storage device for storing control data employed to control said main body of information;

a file device for storing at least said main body of information of said information service unit;

an information utilizer for exercising control while providing said main body of information to said user;

a terminal peripheral section as a specific medium for using said main body of information; and a controller for controlling all operations of all components. Under a precise control, the information that is supplied by the information provider via the communication connector is stored in a storage device or file device belonging to a user, or permission for its employment is provided.

2. An information service processor according to claim 1, wherein said main body of information that forms said information service unit consists of a multimedia digital information set, and said main body of information is divided into a plurality of information regions, and wherein said attached data consists of attribute data, which is attached to said main body of information, that is representative of said main body of information; a plurality of accompanying data sets, which correspond respectively to said information regions, for controlling said information regions as individual control units; and a plurality of region data sets, which respectively define said accompanying data sets.

3. An information service processor according to claim 2, wherein, before said main body of information is employed, in order to provide for protection of copyrights and rights of said information provider, and for security of information, and to prevent illegal use of said information, an information region of said main body of information that is being employed is understood in real time, and wherein, while said accompanying data for said information region manages the use of said main body of information, information is provided to said user.

4. An information service processor according to claim 2, wherein, to provide information using said information service unit, said information provider adds, to said information, data that indicates whether or not storage of said information in a storage device or a file device at a user location is permitted, and transmits the resultant information; wherein, when said storage of said information is permitted, one information service set is stored in said storage device or said file device for later use; and wherein, when said storage of said information is not permitted, said information that is transferred is not stored in said storage device and the use of said information is limited to real time use only.

5. An information service processor according to claim 2, wherein, for each of said information regions of said main body of information, mode information is included that regulates a use type for said information region, and wherein, with said mode information, a determination is made as to whether or not information in said information regions is to be provided for free, or whether or not said information can be employed as an advertisement for said main body of information, such as a demonstration, and information is supplied to said user in accordance with said mode information.

6. An information service processor according to claim 2, wherein, for each of said information regions of said main body of information, copyright information is included that specifies the material which a copyright is claimed and provides for the management of information for said copyright, and wherein, with said copyright information, the use of each of said information regions is separately controlled.

7. An information service processor according to claim 2, wherein, for each of said information regions of said main body of information, information concerning right of ownership and a right of employment are included for control of a transfer of said right of ownership and said right of employment, and wherein the use of said information regions is controlled in accordance with said information concerning said right of ownership and said right of employment.

8. An information service processor according to claim 2, wherein, for each of said information regions of said main body of information, right of portrait information is included for claiming said right of portrait, and wherein the use of said information regions is controlled in accordance with said right of portrait.

9. An information service processor according to claim 2, wherein, for each of said information regions of said main body of information, existence form information is included that indicates an existence form for said information regions, with said information included in said information region being purchased information, copied information, retained information on temporary loan, or original information, and wherein, for employment, said information regions are managed in accordance with said existence form information.

10. An information service processor according to claim 2, wherein, for each of said information regions of said main body of information, encryption information is provided to specify whether or not said information regions should be encrypted and to set an encryption type and an encryption key, and wherein the use of said information regions is controlled in accordance with said encryption information.

11. An information service processor according to claim 2, wherein, for said information regions of said main body of information, abandonment process information is included to specify process methods to be used when said information regions are no longer required, and wherein, when said information regions are to be abandoned, said abandonment process information is used.

12. An information service processor according to claim 2, wherein, for each of said information regions of said main body of information, log information is included to designate the requirement/non-requirement of a log in which are recorded a user, a provision date, a time and a purpose for use, such as merely for reference, for playback or for copying, when said information regions are used, and wherein, in accordance with said log information, when a log is established, said log is so stored that said information provider or said user is capable of referring to the circumstances during which said information region was employed.

13. An information service processor according to claim 2, wherein, for each of said information regions of said main body of information, used information notification data is included to specify said information provider of log information when said information regions are provided for said user, and wherein, when notification is instructed by said information notification data, said information provider is informed of the circumstances concerning the user of the provided information.

14. An information service processor according to claim 2, wherein, for each of said information regions of said main body of information, available space information is included to specify an available space for said information region, and wherein, with said available space information, said information regions are used only in a specific terminal, device or network, or in a specific area.

15. An information service processor according to claim 2, wherein, for each of said information regions of said main body of information, information level data is included to specify an available information level, and wherein, with said information level data, an information service level, such as an image quality or a sound quality, is specified.

16. An information service processor according to claim 2, wherein, for each of said information regions of said main body of information, life span data is included to specify a life span for said information region, and wherein, with said existence period data, the life span of information is specified, and there is information that is to be abandoned after being used once, after being used N times, or after the elapse of a predetermined period of time; or information that is effective until an instruction is received from said information provider; or information that is effective permanently.

17. An information service processor according to claim 2, wherein, for each of said information regions of said main body of information, usage charge data is included to specify a method by which to charge for the use of said information regions that are employed, and wherein, with said usage charge data, a fee, a payment method and a payee are designated to specify a charge unit and a charge method.

18. An information service processor according to claim 2, wherein, for each of said information regions of said main body of information, user data is included to specify a person who is permitted to use said information region, and wherein, only when said user data matches an ID of a user that is input by another method, said information region is permitted to be provided for use of said user.

19. An information service processor according to claim 2, wherein, for each of said information regions of said main body of information, use condition data is included to specify the conditions that are to be satisfied before said information region is provided, and wherein, only when the conditions such as a provision date, a time and a permitted age, are established by said use condition data, said information region can be used.

20. An information service processor according to claim 2, wherein, for each of said information regions of said main body of information, copy enable/disable data are included to specify whether copying of said information region is permitted or inhibited, and wherein all copying is prohibited for said information region for which copying is inhibited.

21. An information service processor according to claim 2, wherein, for each of said information regions of said main body of information, copy condition data is included to specify a permissible range for copying, and wherein a copying process is performed within said permissible range specified by said copy condition data.

22. An information service processor according to claim 2, wherein, for each of said information regions of said main body of information, data is included that, when information in said information region is to be copied, determines whether or not accompanying data in said information region is partially changed and copied together with said information in said information region, and wherein, when copying is designated, information for specifying existence form of information is changed, and said information in said information region is copied together with accompanying data.

23. An information service processor according to claim 2, wherein, for each of said information regions of said main body of information, information type data is included to describe the information types in said information region, and wherein, with said information type data, speech information and video information are identified so as to change processing for said main body of information.

24. An information service processor according to claim 2, wherein, for each of said information regions of said main body of information, user authentication data is included to specify whether or not authentication of a user is required, and wherein, with said user recognition data, high security is ensured relative to the providing of information from said information regions.

25. An information service processor according to claim 2, wherein, for each of said information regions of said main body of information, designation data is included to determine whether or not said information region is to be transferred to an external network, and wherein only an information region for which transfer permission is authorized by said designation data is transferred.

26. An information service processor according to claim 2, wherein, for each of said information regions of said main body of information, printing data is included to determine whether or not said information in said information region is permitted to be printed on a sheet of paper, and wherein only information in said information region for which printing is permitted by said printing data is printed.

27. An information service processor according to claim 2, wherein, for each of said information regions of said main body of information, reprocessing data is included to determine whether or not to permit a user to read information from said information region and to reprocess said information for use, and wherein a user freely reprocesses and recycles information in an information region for which reprocessing is permitted, while reading to perform any process is inhibited relative to an information region for which reprocessing is not permitted.

28. An information service processor according to claim 2, wherein, for each of said information regions of said main body of information, resale data is included to specify whether or not resale of information in said information region is permitted, and wherein, for information in an information region for which resale is inhibited, alteration of accompanying data concerning the selling of and the charges for information is inhibited and the resale activity is eliminated.

29. An information service processor according to claim 2, wherein, for each of said information regions of said main body of information, alteration prevention data is included to prevent alteration of accompanying data that is used to control said main body of information, and wherein, when said main body of information is altered, information for a single information service unit is regarded as invalid and is abandoned.

30. An information service processor according to claim 2, wherein said region data includes connection data for said information region by which to specify the order in which a series of said information regions are to be used, and wherein said region manager and said utilization manager control said information utilizer to furnish said information regions in said order that is specified.

31. An information service processor according to claim 2, wherein said attribute data includes a plurality of sequence data sets as information for specifying a sequence to be employed when said information regions are to be provided, and wherein, with said sequence data, a plurality of information sets are provided from a single main body of information.

32. An information service processor according to claim 2, further comprising an information generator that is connected between said terminal peripheral unit and said file device, wherein, for original information with no accompanying data, said information generator automatically generates a frame for an accompanying data row, and prepares, for said storage device, an information frame with which a new single information service unit, with accompanying data, can be provided.

33. An information service processor according to claim 32, wherein said information generator receives from said terminal peripheral unit a main body of raw information that has no region data and no accompanying data, divides said main body into a plurality of information regions, generates a frame for said region data and said accompanying data and adds said frame to said main body of said raw information, and transfers the resultant information to said file device.

34. An information service processor according to claim 2, wherein, under the control of said utilization manager, said information utilizer synthesizes information in a plurality of information regions, and transmits the resultant information to said terminal peripheral unit in order to simultaneously provide said information for said plurality of information regions.

35. An information service processor according to claim 2, wherein, when video information of said main body of information is to be used in a mute mode in which sounds are deleted, a sound recognition function of said information utilizer converts speech information into character information, and superimposes it as characters on a part of said video information on a display, so that said audio accompanying image can be understood in said mute mode.

36. An information service processor according to claim 2, wherein, part of said accompanying data for each of said information regions that accompany said main body of information is superimposed on one part of a screen to display charge data and provision conditions for a user.

* * * * *

UNITED STATES PATENT AND TRADEMARK OFFICE
CERTIFICATE OF CORRECTION

PATENT NO. : 5,842,023
DATED : November 24, 1998
INVENTOR(S) : Tomoki Tsumura

It is certified that error appears in the above-identified patent and that said Letters Patent is hereby corrected as shown below:

<u>Column 22,</u>
Lines 55-59, delete the following text:
"Under a precise control, the information that is supplied by the information provided via the communication connector is stored in a storage device or file device belonging to a user, or permission for the employment is provided."

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 5,842,023
DATED : November 24, 1998
INVENTOR(S) : Tomoki Tsumura

It is certified that error appears in the above-identified patent and that said Letters Patent is hereby corrected as shown below:

Column 22,
Line 37, "said broadcast communication means;" should read -- a broadcast communication means; --.
Line 41, "said user" should read -- a user --.

Signed and Sealed this

Tenth Day of January, 2006

JON W. DUDAS
*Director of the United States Patent and Trademark Office*